Dec. 5, 1933.  R. E. OLSON ET AL  1,937,666
REGULATING APPARATUS
Filed Nov. 20, 1931  2 Sheets-Sheet 1

INVENTOR
Raymond E. Olson
Robert D. Cleveland
BY
D. Clyde Jones
ATTORNEY

Dec. 5, 1933.   R. E. OLSON ET AL   1,937,666
REGULATING APPARATUS
Filed Nov. 20, 1931   2 Sheets-Sheet 2

INVENTOR
Raymond E. Olson
Robert D. Cleveland
BY
ATTORNEY

Patented Dec. 5, 1933

1,937,666

UNITED STATES PATENT OFFICE 1,937,666

REGULATING APPARATUS

Raymond E. Olson and Robert D. Cleveland, Rochester, N. Y., assignors to Taylor Instrument Companies, Rochester, N. Y., a corporation of New York Application November 20, 1931
Serial No. 576,418

11 Claims. (Cl. 137—145)

This invention relates to time-controlled apparatus of the type suitable for controlling the various steps of an industrial process.

In former devices of this type, it has been customary to provide pilot valves to control the application of pressure fluid to motor valves which, in turn, regulate the various steps or operations to be controlled. The pilot valves of former devices, while they were accurate and reliable in operation, were expensive to manufacture and it is therefore proposed in accordance with the present invention to replace the usual pilot valves in a time-controlled device of the mentioned type, by a series of nozzles, the outlets of which are controlled by a series of baffles movable toward and away from said nozzles by a frame that is actuated in any well-known manner in accordance with a predetermined schedule. In connection with such former devices, it has also been customary to instal motor valves at some distance from their controlling pilot valves with the result that a bulky manifold was required and an installation lacked compactness. In accordance with the present invention, it is also proposed to combine the pilot valves and related motor valves in the device and to utilize the rear wall of the device to replace the saucers or tops usually provided in motor valves of this type.

Figure 1:
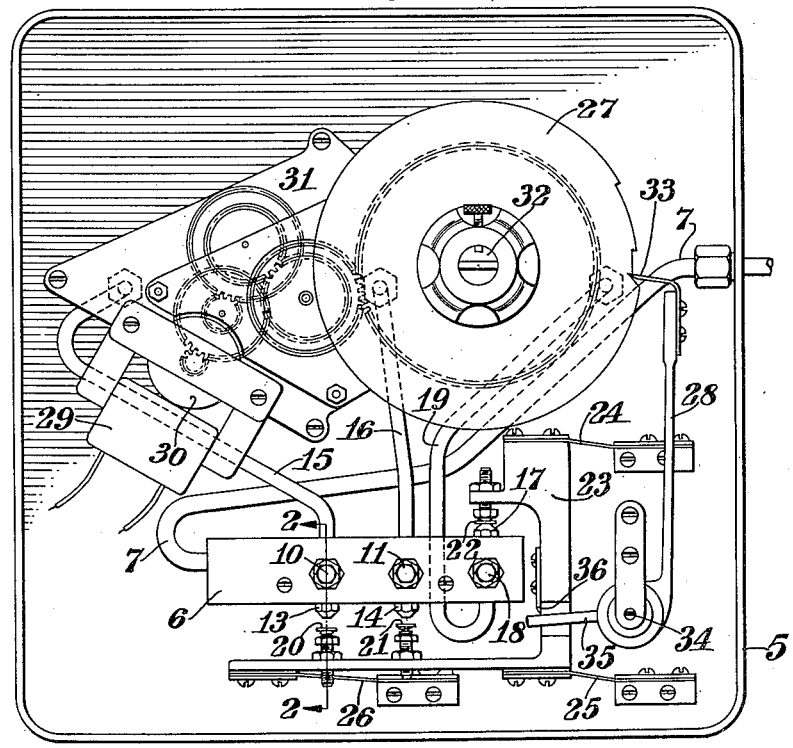
Figure 2:
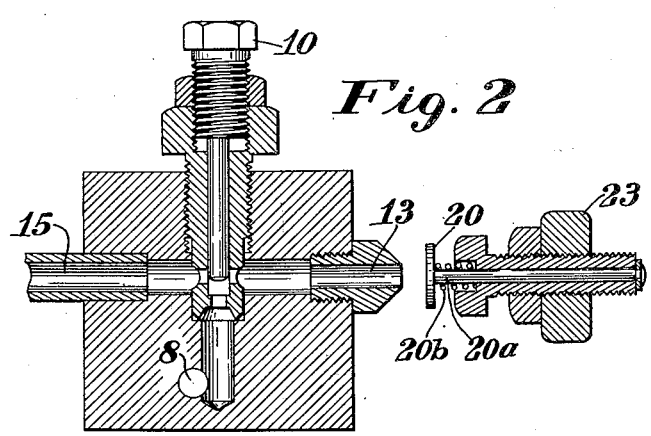
Figure 3:
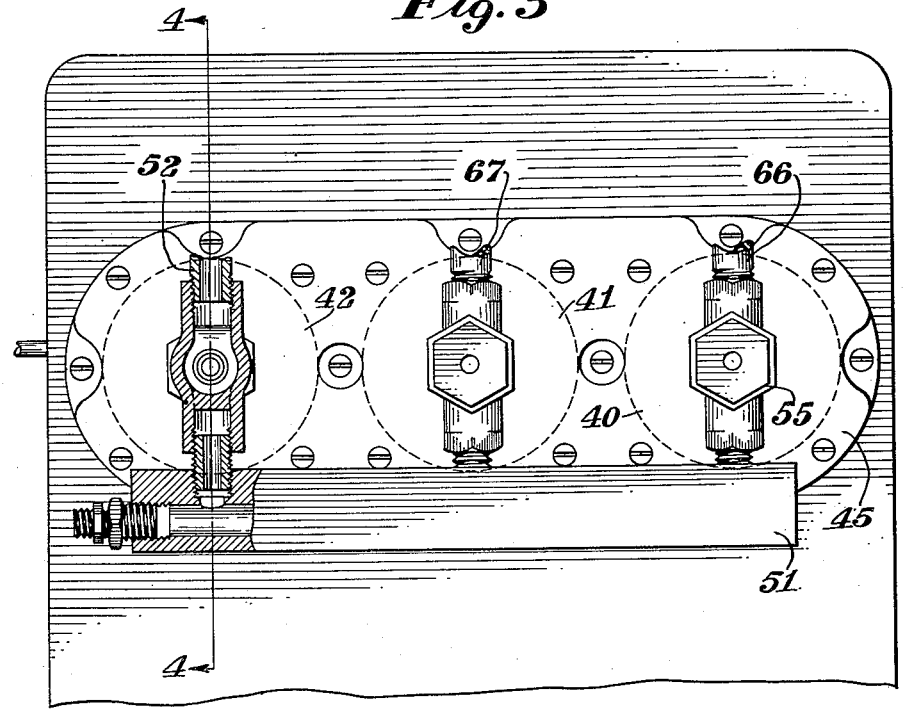
Figure 4:
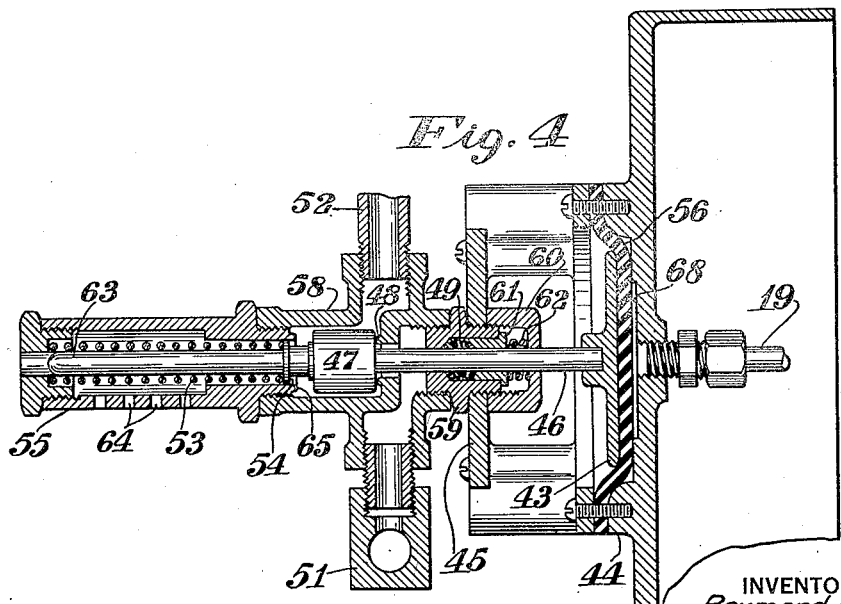

For a clearer understanding of the invention reference is made to the drawings in which Fig. 1 is a front view of the device of the present invention with the door removed to disclose the mechanism within; Fig. 2 is a sectional view of a portion of the structure of Fig. 1 taken on the line 2—2 thereof; Fig. 3 is a rear view of the instrument with a portion thereof broken away to disclose more clearly the structure of one of the motor valves; and Fig. 4 is a sectional view through one of the motor valves taken on the line 4—4 of Fig. 3 looking in the direction of the arrows.

Referring especially to Fig. 1, 5 indicates a casing the back of which serves as a mounting plate for the various parts of the mechanism enclosed therein. On one face of the back of the casing there is mounted a block 6 having a longitudinal bore 8 to which there is connected by a fluid-tight connection a conduit 7 leading to a source of fluid pressure. As shown in the sectional view of Fig. 2 the bore communicates through an adjustable leak 10 with a nozzle 13 at one side of the block and with a conduit 15 at the opposite side thereof. This bore also communicates through adjustable leak 11 with nozzle 14 and its related conduit 16, likewise through adjustable leak 18 with nozzle 17 and its related conduit 19. It will be noted that nozzles 13 and 14 are located on the side of the block opposite to that where nozzle 17 is positioned. As indicated in Figs. 1 and 4, the conduits 15, 16 and 19 lead to the tops of motor valves 40, 41 and 42, respectively. Cooperating with the nozzles 13, 14 and 17 there are provided baffles 20, 21 and 22 which are adjustably mounted in a frame 23 which, in turn, is flexibly suspended on the springs 24, 25 and 26 to have substantially parallel motion. As shown in detail in Fig. 2, each baffle proper includes a stem such as 20a movable lengthwise through the frame 23 but is normally held in the position shown by a coil spring such as 20b. The frame 23 has its motion controlled by a time-actuated cam 27 and a cam follower 28. It will be understood that the cam 27 may be driven from any suitable timing device, but it has been found satisfactory to use a synchronous motor 29 which may be driven from the commercial source of power of known frequency. The rotor 30 of this motor through a suitable train of gears generally designated 31 serves to drive the arbor 32 on which the cam 27 is mounted. The cam follower 28, which is pivotally mounted at 34 on the back of the casing, is provided at one end with a hardened steel follower finger 33 and at its other end with a bell crank arm 35 engaging the knife edge 36 of the frame 33. Thus as the timing device, including the motor 29, rotates the timing cam 27, the cam follower 28 in following the cuttings in the periphery of the cam, actuates the frame 23 to change the relation between the adjustable baffles 20, 21 and 22 and their respective nozzles 13, 14 and 17 in accordance with a predetermined schedule. It should be noted that the normal distance between baffle 21 and its related nozzle 14 is smaller than the normal distance between baffle 20 and its associated nozzle 13. Thus as frame 23 is elevated under the control of cam 27, nozzle 14 is closed by baffle 21, before nozzle 13 is closed by baffle 20.

It has been mentioned that the conduits 15, 16 and 19 lead respectively to the tops of the motor diaphragm valves 40, 41 and 42 (Figs. 3 and 4) mounted on the rear side of the casing 5. As shown in the sectional view of Fig. 4, the back of this casing replaces the usual tops of these various motor valve mechanisms, and is provided with three angular shoulders, one such shoulder being provided for each motor valve. A spider 45 tightly clamps a rubber diaphragm top 56 against the annular shoulder to provide a fluid-tight connection between the shoulder and the diaphragm.

Although any type of motor valve may be employed for this combination, the motor valve herein disclosed has proved to be satisfactory. The valve body generally designated 58 has screw-threaded into one end a bonnet 59 which has a screw-threaded portion passing through an opening in a part of the spider 45 to be engaged by the lock nut 60, so that the valve body proper is rigidly secured to the spider. Within the valve body, there is provided a valve disc assembly 47 against one end of which the valve stem 46 engages. This stem terminates in a driving plate 43 normally engaging one side of the rubber diaphragm 56. Within the bonnet 59 there is provided packing material 49 surrounding the valve stem 46, which packing is held in position by a gland 61 spring-pressed by a coil spring 62 engaging the interior of the lock nut 60. There is attached to the valve body in axial alignment with the valve stem 46, a cylindrical member 55 which serves as a guide for the guide rod 63 of the valve disc and coil spring 53. This spring at one end engaging the end of the cylinder and at its other end engaging shoulder 54 on the guide rod 63, normally holds the valve disc assembly 47 against the valve seat 48. The cylinder 55 is also provided with a number of holes 64 so that it serves as a muffler for pressure fluid escaping therethrough from the conduit 52 when the motor valve is restored to its normal position.

It should be pointed out that when the valve is in its open position, the valve disc assembly engages the valve seat 65 to close the exhaust to the muffler and open a passage from manifold 51, connected to a source of pressure fluid directly to conduit 66 leading to mechanism which is to be controlled by pressure fluid. This manifold also applies pressure fluid to the valves 41 and 42 and when they are opened, this pressure fluid is introduced into conduits 67 and 52, respectively, which lead to various mechanisms which are to be controlled by pressure fluid. In Fig. 4 it will be seen that circular recesses, one for each valve, are provided in the rear face of the casing. These recesses are provided so that the rubber diaphragms will not close the openings to the conduits such as 19. While it has not been deemed necessary to describe the cycle of operation of the apparatus, that is the sequence of opening and closing of the several nozzles by their respective baffles, such cycle of operation will be more fully understood by reference to Foote application Ser. #464,099, filed June 26, 1930.

From the foregoing it will be noted that by the use of nozzles and cooperating baffles, the relatively expensive pilot valves of former devices may be obviated. Furthermore, by utilizing the rear of the casing 5 of the device as a top for the motor valves, the cost of such valves is reduced, the length of the necessary conduit is greatly reduced and the structure of the controlling device and the related motor valves is rendered more compact. Likewise, the size of the manifold usually employed in such devices is greatly reduced with a consequent reduction in cost and reduction in the space necessary for equipment.

The term "nozzle" as herein employed is used in a broad sense to include any type of orifice which is closed by a cooperating surface or baffle.

We claim:

1. In apparatus of the character described, a supply conduit, a plurality of nozzles arranged in a row at one side of said conduit, devices to be actuated, a plurality of branch conduits, each conduit continually communicating with a device and a nozzle, said supply conduit communicating with each branch conduit through a constriction a baffle for each nozzle, and a member for moving said baffles simultaneously with respect to said nozzles.

2. In apparatus of the character described, a supply conduit, a plurality of nozzles arranged in a row at one side of said conduit, devices to be actuated, a plurality of branch conduits, each conduit communicating with a device and a nozzle, said supply conduit having a restricted passageway leading to each conduit and its related nozzle, a baffle for each nozzle, and an arm actuated in accordance with a predetermined schedule for moving said baffles simultaneously with respect to said nozzles.

3. In apparatus of the character described, a supply conduit, a plurality of nozzles in substantial alignment at one side of said conduit, a nozzle at the opposite side of said conduit, a branch conduit individual to each nozzle, said supply conduit having a restricted passageway leading to each conduit and its related nozzle, a baffle for each nozzle and a frame having parallel members extending in the same general direction and actuated in accordance with a predetermined schedule for moving certain of said baffles simultaneously with respect to said nozzles.

4. In apparatus of the character described, a supply conduit, a plurality of nozzles arranged in a row at one side of said conduit, devices to be actuated, a plurality of branch conduits, each conduit communicating with a device and a nozzle, said supply conduit having a restricted passageway leading to each conduit and its related nozzle, a baffle for each nozzle, a frame supporting said baffles, and means including a rotary cam and a cam follower for actuating said frame, said rotary cam having a composite surface the component parts of which follow each other in a definite order, have definite angular extents and are at different distances away from the center of rotation of the cam.

5. In apparatus of the character described, a casing, a plurality of motor valves mounted on one side of said casing, each valve including a flexible diaphragm, each diaphragm together with the casing forming an actuating chamber for driving the moving portion of its related valve, and means mounted on the other side of said casing and actuated in accordance with time to supply pressure fluid to the chambers of said valves in accordance with a predetermined schedule.

6. In apparatus of the character described, a casing having mounted therein a pressure fluid supply conduit and a plurality of branch conduits, timing means within said casing for controlling the application of pressure fluid from said supply conduit to said branch conduits according to a prearranged schedule, and a series of motor valves one for each branch conduit mounted on the outside of said casing, each valve being provided with an actuating diaphragm having its edge cooperating with the surface of said casing to define therewith a fluid receiving chamber, one of said branch conduits leading to each chamber.

7. In apparatus of the character described, a pressure fluid supply manifold, a series of valves each operating to control the flow of pressure fluid from said manifold to a related conduit, each valve including a valve stem and an actuating plate, an actuating diaphragm for each valve engaging the actuating plate thereof, a casing to which each diaphragm is attached to define therewith a pressure fluid chamber, control conduits opening through said casing into said chambers, and actuating mechanism within said casing for controlling the application of pressure fluid through said control conduits to said chambers.

8. In apparatus of the character described, a pressure fluid supply manifold, a series of valves each operating to control the flow of pressure fluid from said manifold to a related conduit, each valve including a valve stem and an actuating plate, an actuating diaphragm for each valve engaging the actuating plate thereof, a casing provided with a plurality of shoulders, one for each valve, means for attaching each valve to the casing with its diaphragm in fluid-tight engagement with a shoulder to define a pressure fluid chamber, a control conduit individual to each chamber, and actuating mechanism within said casing for controlling the application of pressure fluid through said control conduits to said chambers.

9. In apparatus of the character described, a pressure fluid supply manifold, a series of valves each operating to control the flow of pressure fluid from said manifold to a related conduit, each valve including a valve stem and an actuating plate, an actuating diaphragm for each valve engaging the actuating plate thereof, a casing provided with a plurality of annular shoulders, one for each valve, and a recess in the wall of the casing enclosed by each shoulder, means for attaching each valve to the casing with its diaphragm in fluid-tight engagement with an annular shoulder to define a pressure fluid chamber, a control conduit individual to each chamber, and actuating the mechanism within said casing for controlling the application of pressure fluid through said control conduits to said chambers.

10. In apparatus of the character described, a pressure fluid supply manifold, a series of valves each operating to control the flow of pressure fluid from said manifold to a related conduit and from its related conduit to the open air, each valve including a valve stem engaging a valve disc and an actuating plate, an actuating diaphragm for each valve engaging the actuating plate thereof, a casing to which said diaphragm is attached to define therewith a pressure fluid chamber, control conduits opening through said casing into said chambers, and actuating mechanism within said casing for controlling the application of pressure fluid through said control conduits to said chamber.

11. In apparatus of the character described, a pressure fluid supply manifold, a series of valves each operating to control the flow of pressure fluid from said manifold to a related conduit and from said related conduit to atmospheric pressure, each valve including a valve disc, a guide rod therefor, a valve stem and an actuating plate, a cylinder attached to said valve and surrounding said guide rod, a coil spring within said cylinder serving normally to hold said valve disc in a position to connect its related conduit to atmospheric pressure, said cylinder being closed except for restricted apertures therein to serve as a muffler, an actuating diaphragm for each valve engaging the actuating plate thereof, a casing to which said diaphragm is attached to define therewith a pressure fluid chamber, control conduits opening through said casing into said chambers, and actuating mechanism within said casing for controlling the application of pressure fluid through said control conduits to said chamber.

RAYMOND E. OLSON.
ROBERT D. CLEVELAND.